United States Patent
Katayama

(10) Patent No.: US 6,289,387 B1
(45) Date of Patent: Sep. 11, 2001

(54) REMOTE MODULE CONTROL SYSTEM FOR CONTROLLING MODULE DISPOSED AT REMOTE PLACE WHICH ACCOMMODATES LINE/TRUNK CIRCUIT AND CONTROL METHOD THEREOF

(75) Inventor: Kazuya Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/127,790

(22) Filed: Aug. 3, 1998

(30) Foreign Application Priority Data

Aug. 5, 1997 (JP) .................................................. 9-210617

(51) Int. Cl.[7] ............................. G06F 15/16; G06F 11/00
(52) U.S. Cl. ........................................... 709/232; 370/236
(58) Field of Search .................................. 709/237, 238, 709/217, 224, 227, 232; 370/229, 230, 235, 236

(56) References Cited

U.S. PATENT DOCUMENTS

| | | | | |
|---|---|---|---|---|
| 5,504,865 | * | 4/1996 | Mabuchi | 395/200.14 |
| 5,513,321 | * | 4/1996 | Katori | 395/200.15 |
| 5,913,035 | * | 6/1999 | Waters et al. | 395/200.54 |
| 5,978,894 | * | 11/1999 | Sukegawa et al. | 711/203 |
| 6,003,064 | * | 12/1999 | Wicki et al. | 709/200 |
| 6,014,710 | * | 1/2000 | Talluri et al. | 709/237 |

FOREIGN PATENT DOCUMENTS

WO 96/38792 * 12/1996 (WO).

* cited by examiner

Primary Examiner—Dung C. Dinh
Assistant Examiner—Kenneth W. Fields
(74) Attorney, Agent, or Firm—McGuireWoods LLP

(57) ABSTRACT

A remote module control system in which a remote module includes data information management means for managing data information indicative of existence/non-existence of data to be transferred which is to be transferred to a switching system and notifying the switching system of the data information as required and data transmission means for transmitting data to be transferred to the switching system, the switching system includes first storage means for storing data information received from the remote module, second storage means for storing data to be transferred received from the remote module and reception information setting means for setting reception information indicative of the reception of data to be transferred based on data information stored in the first storage means, and a central processor mounted on the switching system obtains data to be transferred stored in the second storage means according to reception information.

9 Claims, 6 Drawing Sheets

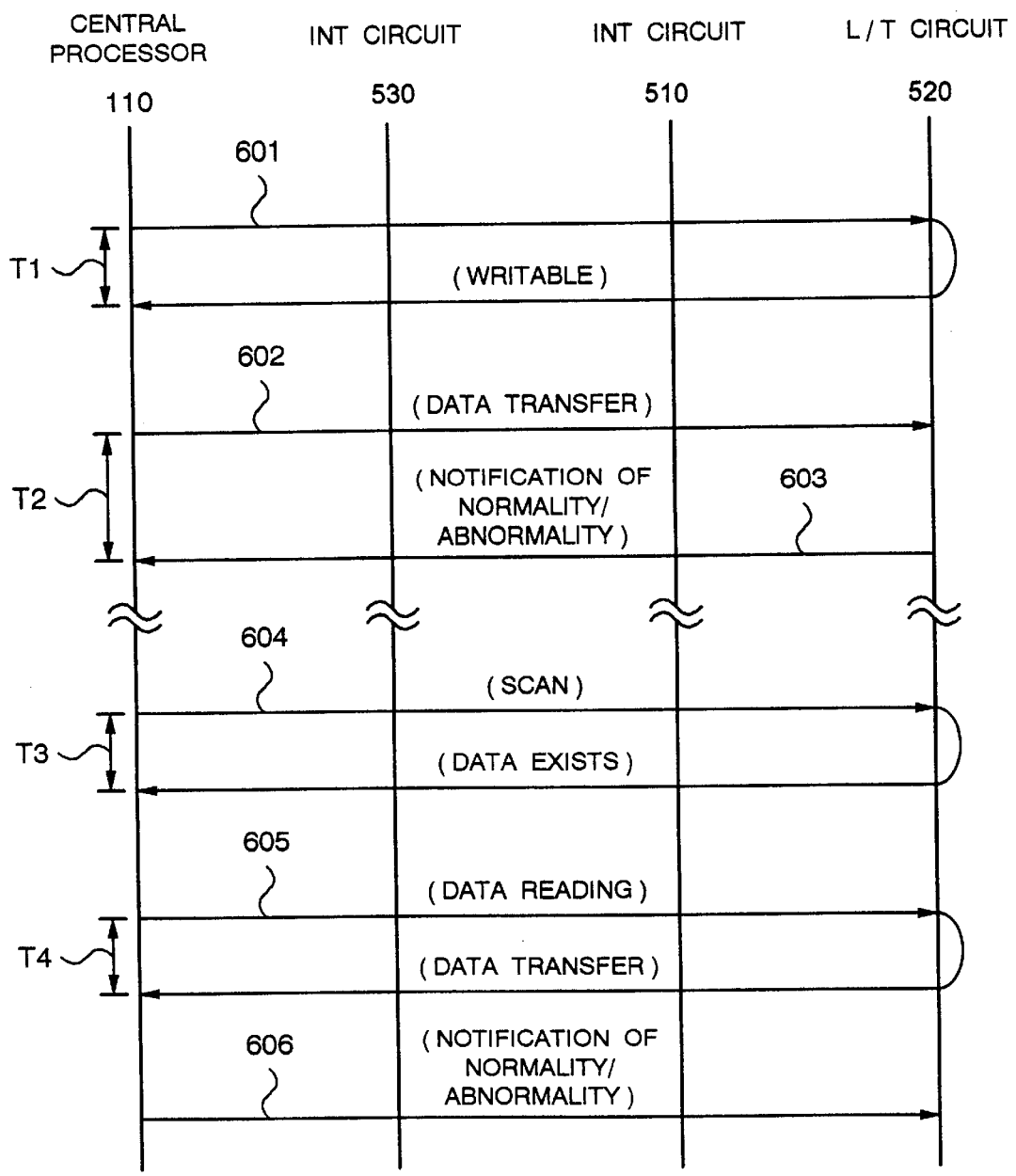

United States Patent … US 6,289,387 B1

REMOTE MODULE CONTROL SYSTEM FOR CONTROLLING MODULE DISPOSED AT REMOTE PLACE WHICH ACCOMMODATES LINE/TRUNK CIRCUIT AND CONTROL METHOD THEREOF

BACKGROUND OF THE INVENTION

1. Field of the Invention

The present invention relates to a remote module control system for controlling, through a switching system, a module which is disposed at a place remote from the switching system and accommodates a plurality of line/trunk circuits, and a control method thereof.

2. Description of the Related Art

For accommodating a plurality of subscriber's terminals located at a place remote (remote place) from a place where a switching system is arranged, employed is a mode of disposing a module which accommodates each subscriber's terminal at the remote place and connecting the module (this module will be referred to as a remote module hereinafter) and the switching system by a predetermined interface to accommodate each subscriber's terminal in the switching system. FIG. 5 is a block diagram showing structure of a system which accommodates a subscriber's terminal at a remote place by the control of such a remote control module. With reference to FIG. 5, a subscriber's terminal 300 arranged at a remote place is accommodated in a remote module 200 disposed at the remote place, and the remote module 200 and a switching system 100 are connected with each other through a predetermined interface.

The remote module 200 includes an interface circuit (INT circuit) 510 for the connection with the switching system 100 and also includes, in one-to-one correspondence to each subscriber's terminal 300, a line/trunk circuit (L/T circuit) 520 which accommodates the subscriber's terminal 300.

The switching system 100 includes a time-division switch 120 for conducting switched connection, an L/T circuit 140 for accommodating a subscriber's terminal (not shown) and a central processor 110 for controlling the time-division switch 120 and the L/T circuit 140 and also includes, in one-to-one correspondence to each remote module 200, an INT circuit 530 for the connection with the remote module 200. The central processor 110 also controls the L/T circuit 520 of the remote module 200 through the INT circuit 530.

In a conventional remote module control method, control of each L/T circuit 520 of the remote module 200 from the central processor 110 is realized by the reception and transmission of signals between the central processor 110 and the L/T circuit 520 through the INT circuit 530 and the INT circuit 510 of the remote module 200. In other words, this is the same procedure as that for controlling the L/T circuit 140 of the switching system 100 which accommodates a subscriber's terminal.

FIG. 6 is a sequence diagram showing operation according to a remote module control method by a conventional system. With reference to FIG. 6, in a case of data writing to the L/T circuit 520 of the remote module 200 from the central processor 110 of the switching system 100, the central processor 110, in order to confirm data-writability/data-unwritability of the L/T circuit 520, first scans the L/T circuit 520 for checking writability/unwritability through the INT circuit 530 and the INT circuit 510 (Step 601).

When it is confirmed by the scanning at Step 601 that the L/T circuit 520 is data-writable, the central processor 110 transfers data to the L/T circuit 520 through the INT circuit 530 and the INT circuit 510 (Step 602). Upon reception of the data, the L/T circuit 520 checks normality of the received data and notifies the central processor 110 of the result of the check through the INT circuit 510 and the INT circuit 530 (Step 603). When the check result shows normality of the received data, the central processor 110 finishes the data writing processing. On the other hand, when the result shows abnormality of the received data, processing will be repeated starting at Step 601.

For reading data from the L/T circuit 520 of the remote module 200, the central processor 110 first scans the L/T circuit 520 through the INT circuit 530 and the INT circuit 510 in order to confirm existence/non-existence of data to be read from the L/T circuit 520 (Step 604).

When it is confirmed by the scanning at Step 604 that data to be read exists in the L/T circuit 520, the central processor 110 reads the data from the L/T circuit 520 through the INT circuit 530 and the INT circuit 510 (Step 605). After the reception of the data, the central processor 110 checks normality of the received data and notifies the L/T circuit 520 of the result of the check through the INT circuit 530 and the INT circuit 510 (Step 606) to finish the reading processing.

The above-described conventional remote module control method, however, has a shortcoming that because a central processor of a switching system directly controls a line/trunk circuit of a remote module, a transmission delay of an interface circuit or a line increases a latency of the central processor to reduce a processing capacity.

In a case of the operation shown in FIG. 6, for example, transmission delays T1 to T4 are generated at the respective operations.

SUMMARY OF THE INVENTION

An object of the present invention is to provide a remote module control system which solves the above-described conventional drawback and reduces a latency of a central processor of a switching system to improve a processing capacity and a control method thereof.

According to the first aspect of the invention, a remote module control system for controlling, from a switching system, a remote module which is disposed at a place remote from the switching system and accommodates a plurality of line/trunk circuits, the remote module comprises data information management means for managing data information indicative of existence/non-existence of data to be transferred which is to be transferred to the switching system and notifying the switching system of the data information as required, and data transmission means for transmitting the data to be transferred indicated by the data information to the switching system, the switching system comprises a central processor for controlling the line/trunk circuits, and interface means for connecting the central processor and the remote module, wherein the interface means comprises first storage means for storing the data information received from the remote module, second storage means for storing the data to be transferred received from the remote module, and reception information setting means for monitoring the first storage means to set reception information indicative of the reception of the data to be transferred based on the data information stored, wherein the central processor monitors the reception information setting means to obtain the data to be transferred stored in the second storage means according to the reception information.

In the preferred construction, the data information management means of the remote module comprises flag setting means for setting flag data indicative of existence/non-existence of the data to be transferred, and flag management means for monitoring the flag data set by the flag setting means to transmit the flag data to the switching system according to the state of the flag data.

In the preferred construction, the reception information setting means of the switching system comprises data information management means for monitoring the data information stored at the first storage means, and flag data setting means for setting flag data indicative of the reception of the data to be transferred indicated by the data information under control of the data information management means, wherein the central processor monitors the flag data setting means to obtain the data to be transferred stored at the second storage means according to the state of the flag data.

In another preferred construction, the data information management means of the remote module comprises first flag setting means for setting first flag data indicative of existence/non-existence of the data to be transferred, and first flag management means for monitoring the first flag data set by the first flag setting means to transmit the first flag data to the switching system according to the state of the flag data, the reception information setting means of the switching system comprises second flag management means for monitoring the first flag data stored at the first storage means, and second flag setting means for setting second flag data indicative of the reception of the data to be transferred indicated by the first flag data under control of the second flag management means, wherein the central processor monitors the second flag setting means to obtain the data to be transferred stored at the second storage means according to the state of the second flag data.

According to the second aspect of the invention, a remote module control method of controlling, from a switching system, a remote module which is disposed at a place remote from the switching system and accommodates a plurality of line/trunk circuits, comprising the steps of in the remote module, managing data information indicative of existence/non-existence of data to be transferred which is to be transferred to the switching system and notifying the switching system of the data information as required, and transmitting the data to be transferred indicated by the data information to the switching system, and in the switching system, storing the data information and the data to be transferred received from the remote module at predetermined storage means, setting reception information indicative of the reception of the data to be transferred based on the data information stored at the storage means, and obtaining the data to be transferred stored at the storage means according to the reception information by a central processor mounted on the switching system for controlling the line/trunk circuits.

In the preferred construction, the data information management step of the remote module comprises setting flag data indicative of existence/non-existence of the data to be transferred, and monitoring the flag data to transmit the flag data to the switching system according to the state of the flag data.

In the preferred construction, at the reception information setting step of the switching system, the data information stored at the storage means is monitored to set flag data indicative of the reception of the data to be transferred indicated by the data information, and at the data to be transferred obtaining step, the central processor obtains the data to be transferred stored at the storage means according to the state of the flag data.

Also, the data information management step of the remote module comprises setting first flag data indicative of existence/non-existence of the data to be transferred, and monitoring the first flag data to transmit the first flag data to the switching system according to the state of the first flag data, the reception information setting step of the switching system comprises monitoring the first flag data stored at the storage means to detect a state change of the first flag data, and setting second flag data indicative of the reception of the data to be transferred indicated by the first flag data according to the detected state of the first flag data, and at the data to be transferred obtaining step, the central processor obtains the data to be transferred stored at the storage means according to the state of the second flag data.

According to another aspect of the invention, a computer readable memory storing a remote module control program for controlling, from a switching system, a remote module which is disposed at a place remote from the switching system and accommodates a plurality of line/trunk circuits, the remote module control program comprising the steps of in the remote module, managing data information indicative of existence/non-existence of data to be transferred which is to be transferred to the switching system and notifying the switching system of the data information as required, and transmitting the data to be transferred indicated by the data information to the switching system, and in the switching system, storing the data information and the data to be transferred received from the remote module at predetermined storage means, setting reception information indicative of the reception of the data to be transferred based on the data information stored at the storage means, and obtaining the data to be transferred stored at the storage means according to the reception information by a central processor mounted on the switching system for controlling the line/trunk circuits.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 6 is a sequence diagram showing a conventional remote module control method.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid obscuring the present invention.

Figure 1:
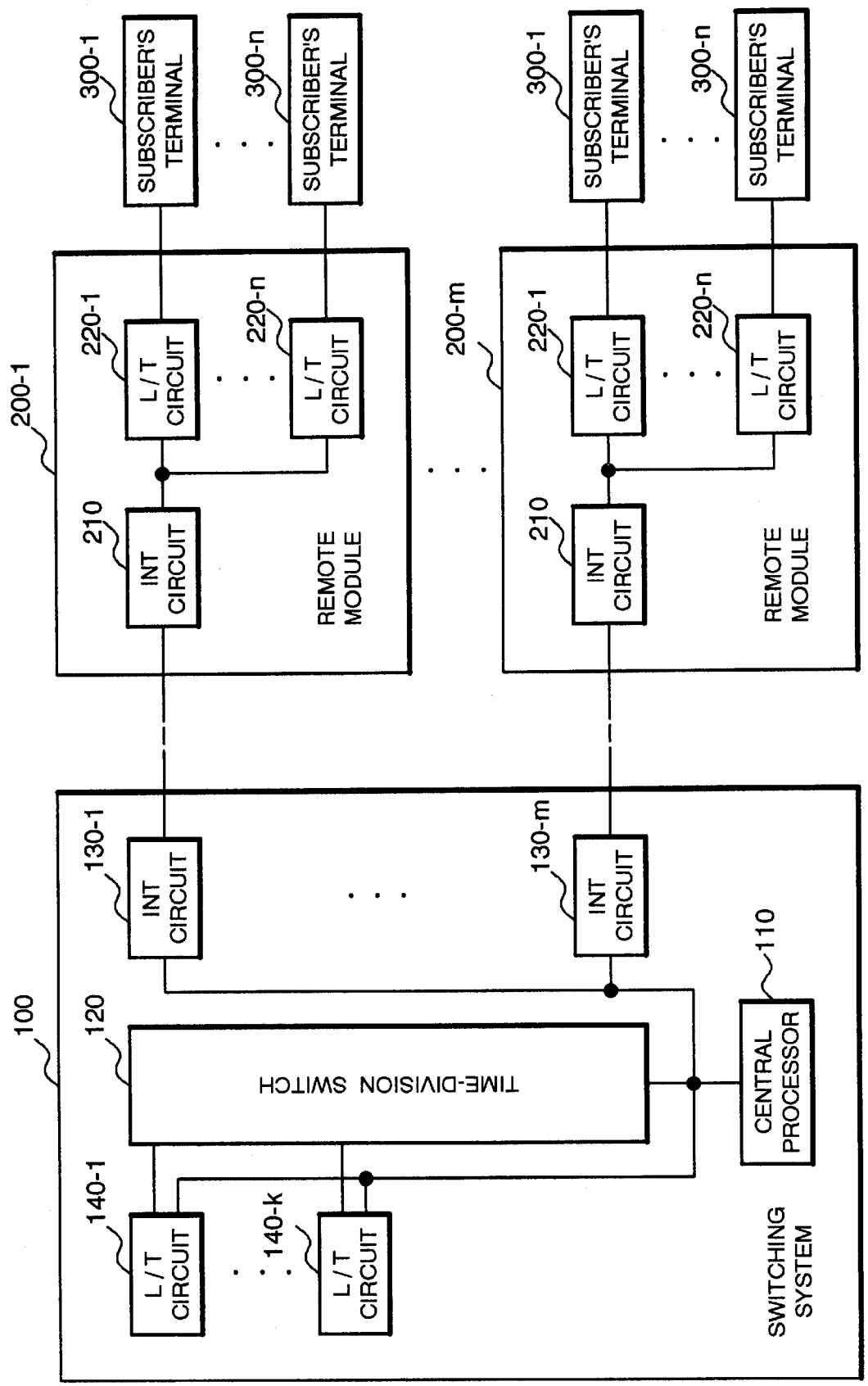
FIG. 1 is a block diagram showing structure of a remote module control system according to one embodiment of the present invention.
Figure 5:
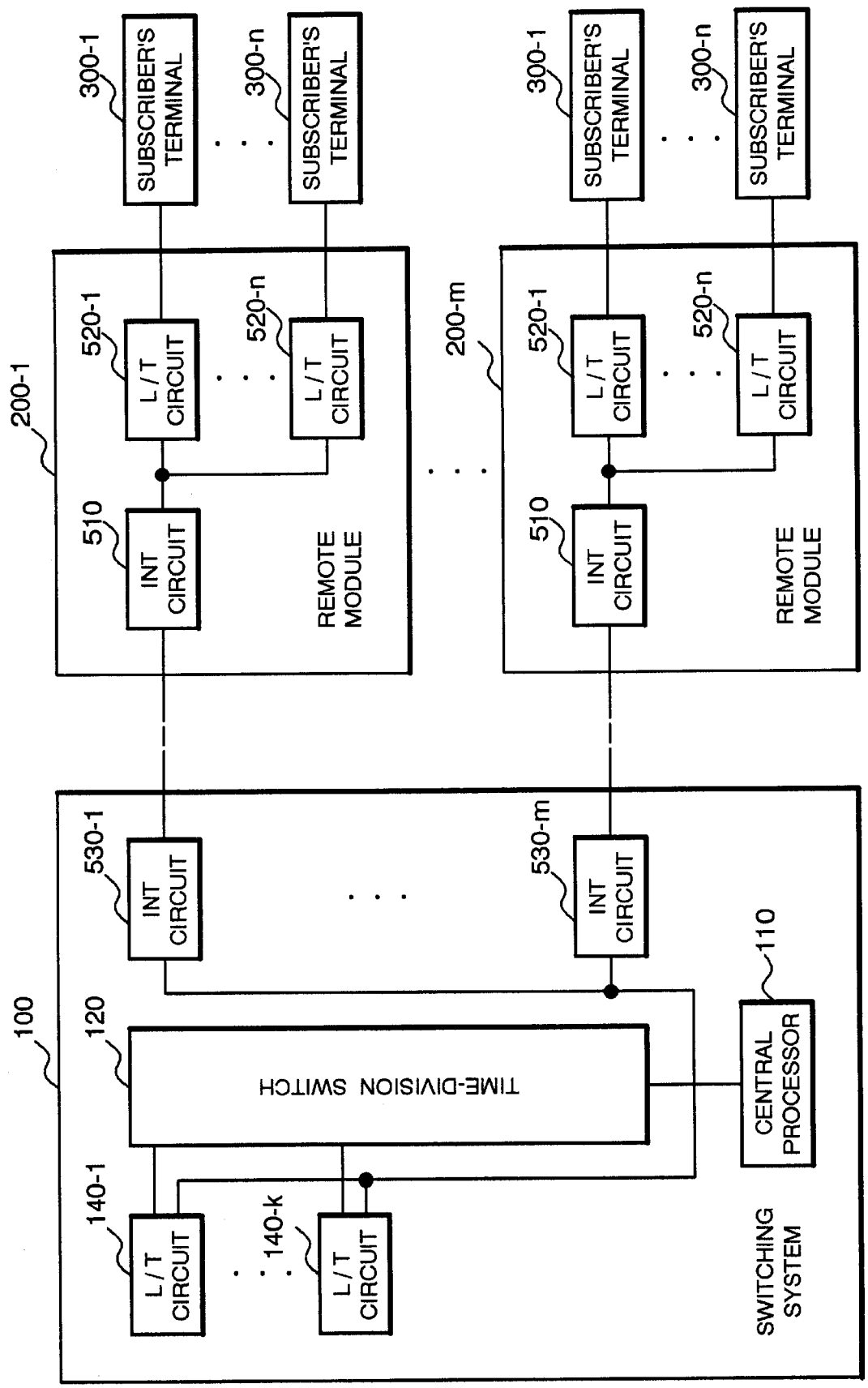
FIG. 5 is a block diagram showing structure of a conventional remote module control system.

FIG. 1 is a block diagram showing structure of a remote module control system according to one embodiment of the present invention. As illustrated in the figure, the entire structure of the present embodiment is the same as that of the conventional system for controlling the remote module shown in FIG. 5. More specifically, a subscriber's terminal 300 arranged at a remote place is accommodated in a remote module 200 provided at the remote place, and the remote module 200 and a switching system 100 are connected with each other through a predetermined interface.

The remote module 200 then includes an interface circuit (INT circuit) 210 for the connection with the switching system 100 and also includes, in one-to-one correspondence to each subscriber's terminal 300, a line/trunk circuit (L/T circuit) 220 for accommodating the subscriber's terminal 300.

The switching system 100 includes a time-division switch 120 for conducting switched connection, an L/T circuit 140 for accommodating a subscriber's terminal (not shown) and a central processor 110 for controlling the time-division switch 120 and the L/T circuit 140 and also includes, in one-to-one correspondence to each remote module 200, an INT circuit 130 for the connection with the remote module 200.

The central processor 110 also controls the L/T circuit 220 of the remote module 200 through the INT circuit 130. In the present embodiment, the control is realized not by conventional direct control through the reception and transmission of signals between the central processor 110 and the L/T circuit but by the use of flag data indicative of existence/non-existence of data to be transferred in the L/T circuit 220 to enable the central processor 110 to transfer data as required while grasping a state of the L/T circuit 220 as will be described later.

The switching system 100 and the remote module 200 are implemented, for example, by a program-controlled microcomputer. A computer program which controls the microcomputer is stored, for retrieval, in such a common storage medium as a magnetic disk, an optical disk or a semiconductor memory, and is loaded into a data processor of the microcomputer to execute each of the following functions.

Figure 2:
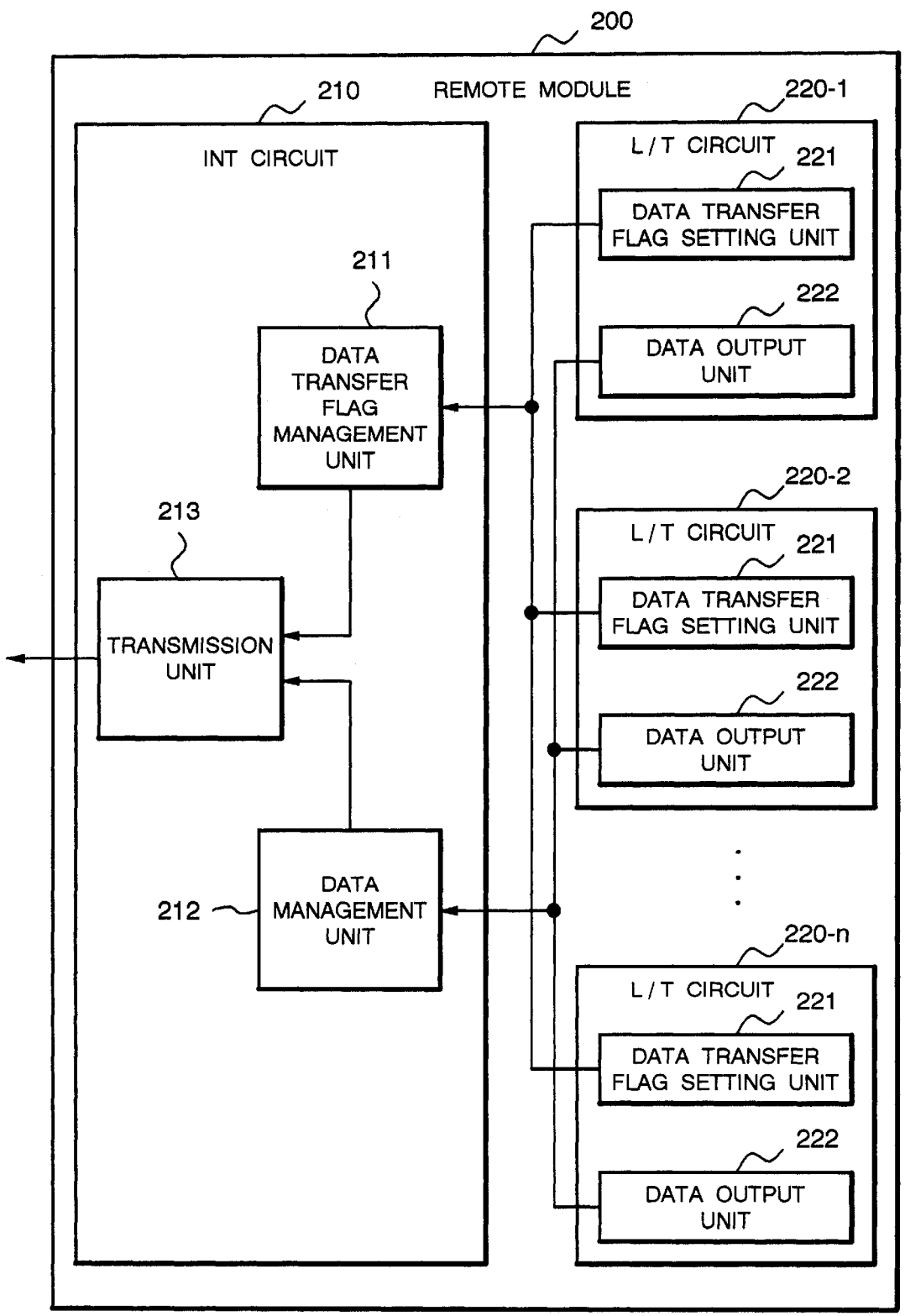
FIG. 2 is a block diagram showing structure of a remote module according to the present embodiment.

FIG. 2 is a block diagram showing structure of the remote control module 200. With reference to FIG. 2, the remote module 200 includes an INT circuit 210, and an L/T circuit 220 for accommodating the subscriber's terminal 300. As mentioned above, the L/T circuit 220 is provided in one-to-one correspondence to each subscriber's terminal 300 that the circuit 220 accommodates and each L/T circuit 200 has the same structure. In FIG. 2, illustration is made only of a characteristic part of the structure of the present embodiment and that of the remaining common part is omitted. In addition, as to the remote module 200, a plurality of the modules 200 can be connected to one switching system 100 and each remote module 200 has the same structure.

The L/T circuit 220 includes a data transfer flag setting unit 221 for setting a data transfer flag and a data output unit 222 for outputting data to be transferred to the central processor 110 through the INT circuit 210. A data transfer flag here represents a flag indicative of existence/non-existence of data to be transferred to the central processor 110 of the switching system 100, that is, data to be transferred.

The INT circuit 210 includes a data transfer flag management unit 211 for managing the data transfer flag setting unit 221 of each L/T circuit 220, a data management unit 212 for managing the data output unit 222 of each L/T circuit 220, and a transmission unit 213 for transmitting a data transfer flag and data to be transferred as outputs of the data transfer flag management unit 211 and the data management unit 212, respectively, to the switching system 100.

The data transfer flag management unit 211 monitors each L/T circuit 220 and when a data transfer flag of the predetermined data transfer flag setting units 221 changes, reads the data transfer flag in question and outputs the same to the switching system 100 through the transmission unit 213.

The data management unit 212 accepts data to be transferred or output from each data output unit 222 and outputs the same to the switching system 100 through the transmission unit 213.

When a rate of data transfer between the INT circuit 130 of the switching system 100 and the INT circuit 210 is low, a buffer memory of FIFO etc. may be provided between the transmission unit 213 and the data management unit 212.

Figure 3:
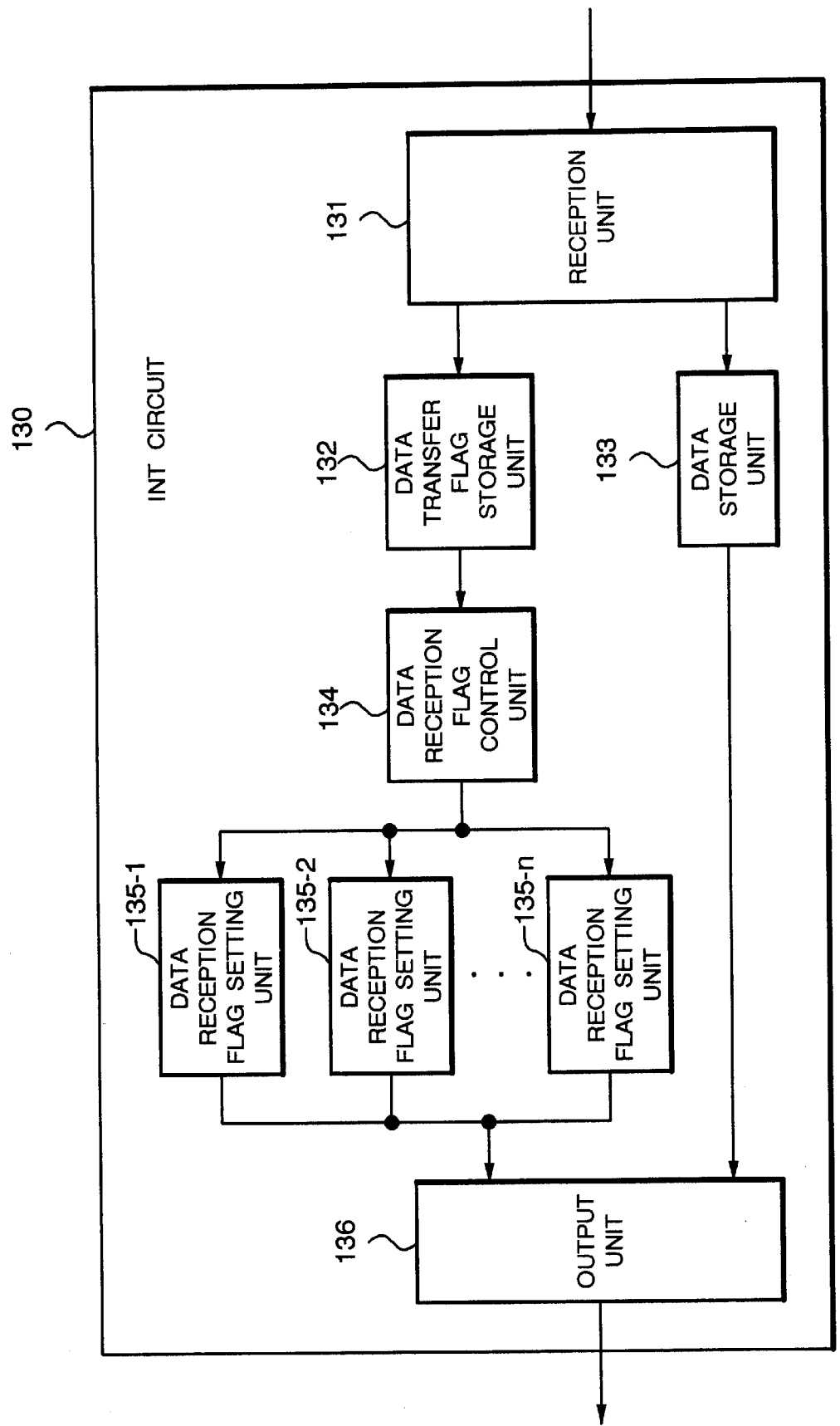
FIG. 3 is a block diagram showing structure of an INT circuit of a switching system in the present embodiment.

FIG. 3 is a block diagram showing structure of the INT circuit 130 provided in the switching system 100. As described in the foregoing, as to the INT circuit 130, a plurality of INT circuits can be provided corresponding to the remote modules 200 connected to the switching system 100 and each of the INT circuits 130 has the same structure. With reference to FIG. 3, the INT circuit 130 includes a reception unit 131 for receiving a data transfer flag and data to be transferred or sent from the remote module 200, a data transfer flag storage unit 132 for storing data transfer flags received at the reception unit 131 in the order of the reception, a data reception flag control unit 134 and a data reception flag setting unit 135 for setting a data reception flag based on a data transfer flag stored in the data transfer flag storage unit 132, a data storage unit 133 for storing data to be transferred received at the reception unit 131 in the order of the reception, and an output unit 136 for reading a data reception flag from the data reception flag setting unit 135 and transferred data from the data storage unit 133 and sending the same to the central processor 110. Used as the data transfer flag storage unit 132 and the data storage unit 133 are buffer memories of FIFO, for example. In FIG. 3, illustration is made only of a characteristic part of the structure of the present embodiment and that of the remaining common part is omitted.

The data reception flag setting unit 135 is provided at each L/T circuit 220 of the remote module 200. Then, under control of the data reception flag control unit 134, the unit 135 sets a data reception flag indicative of reception of new data to be transferred.

The data reception flag control unit 134 monitors the data transfer flag storage unit 132 and when a data transfer flag corresponding to the predetermined L/T circuit 220 indicates the existence of data to be transferred, controls the data reception flag setting unit 135 corresponding to the L/T circuit 220 which has output the data transfer flag and the data to be transferred to set a data reception flag.

Figure 4:
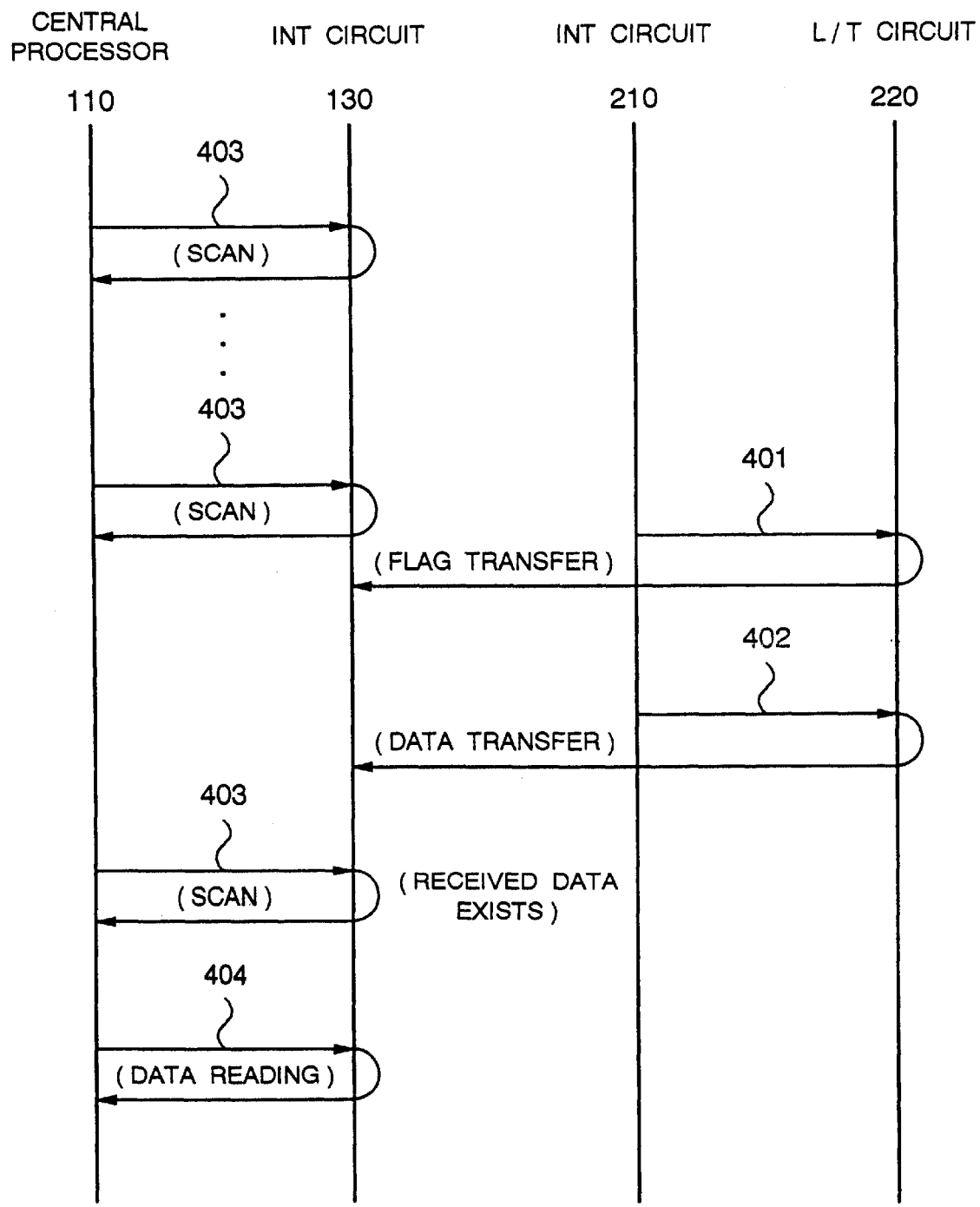
FIG. 4 is a sequence diagram showing operation of the present embodiment.

Next, operation of the present embodiment will be described with respect to a case where the subscriber's terminal 300 enters an off-hook state. FIG. 4 is a sequence diagram showing operation of the present embodiment.

The INT circuit 210 of the remote module 200 periodically scans the data transfer flag setting unit 221 of each L/T circuit 220 by means of the data transfer flag management unit 211 to monitor a state change of a data transfer flag. On this occasion, when the subscriber's terminal 300 corresponding to the predetermined L/T circuit 220 enters the off-hook state, data indicative of the state change is generated in the L/T circuit 220 in question as data to be transferred to the central processor 110, that is, data to be transferred. A data transfer flag of the data transfer flag setting unit 221 in the L/T circuit 220 in question changes to indicate that data exists.

Then, the data transfer flag management unit 211 of the INT circuit 210 reads the data transfer flag from the data transfer flag setting unit 221 of the L/T circuit 220 and transmits the same to the switching system 100 through the transmission unit 213 (Step 401). In the switching system 100, the data transfer flag in question is received at the reception unit 131 of the INT circuit 130 and stored at the data transfer flag storage unit 132.

In parallel to the above-described operation, the data management unit 212 of the INT circuit 210 accepts data to be transferred output from the data output unit 222 of the L/T circuit 220, in this case, data indicating that the subscriber's terminal 300 is in the off-hook state, and transmits the data to the switching system 100 through the transmission unit 213 (Step 402). In the switching system 100, the data to be transferred in question is received at the reception unit 131 of the INT circuit 130 and stored at the data storage unit 133.

In the switching system 100, the data reception flag control unit 134 sequentially reads data transfer flags. Then, the unit 134 controls the data reception flag setting unit 135 corresponding to the L/T circuit 220 as a source of transfer of the read data transfer flag to set a data reception flag indicative of a state of the data transfer flag. The set data reception flag is output to the central processor 110 through the output unit 136.

The central processor 110 periodically scans outputs of each INT circuit 130 to monitor a state change of a data reception flag (Step 403). Therefore, by the scanning by the central processor 110 after the reception of a data transfer flag by the INT circuit 130 at Step 401 and the output of a data reception flag, a change of the data reception flag in question is acknowledged and storage of data to be transferred from the L/T circuit 220 at the data storage unit 133 is recognized.

Under these circumstances, the central processor 110 immediately reads, from the data storage unit 133 of the INT circuit 130, data to be transferred from the L/T circuit 220, that is, information indicating that the subscriber's terminal 300 is in the off-hook state (Step 404).

Although the foregoing description has been made assuming that at the remote module 200, the data transfer flag management unit 211 of the INT circuit 210 scans the data transfer flag setting unit 221 of each L/T circuit 220, the present embodiment is not limited thereto. For example, it is possible to arrange each L/T circuit 220 to notify the data transfer flag management unit 211 of a state change of a data transfer flag of the data transfer flag setting unit 221.

As described in the foregoing, according to the remote module control system of the present invention and the control method thereof, from a remote module to a switching system, a data transfer flag indicative of existence/non-existence of data to be transferred which is data to be transferred to the switching system and the data to be transferred in question are transmitted, while at the switching system, the received data transfer flag and data to be transferred are stored and a central processor of the switching system monitors each data transfer flag to read relevant data to be transferred according to the state change. This enables the central processor to recognize existence/non-existence of data to be transferred only by scanning a state change of a data transfer flag held in the switching system without sending and receiving signals to and from the remote module, and to obtain the data to be transferred in question by further reading the data to be transferred from an interface circuit of its own system. As a result, a latency of the central processor caused by a transmission delay in the interface circuit and that on a line between the switching system and the remote module can be reduced to improve a processing capacity.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A remote module control system for controlling, from a switching system, a remote module which is disposed at a place remote from said switching system and accommodates a plurality of line/trunk circuits, said remote module comprising:

data information management means for managing data information indicative of existence/non-existence of data to be transferred which is to be transferred to said switching system and notifying said switching system of the data information as required; and data transmission means for transmitting said data to be transferred indicated by said data information to said switching system, said switching system comprising:

a central processor for controlling said line/trunk circuits; and interface means for connecting said central processor and said remote module, wherein said interface means comprises:

first storage means for storing said data information received from said remote module, second storage means for storing said data to be transferred, received from said remote module, and reception information setting means for monitoring said first storage means to set reception information indicative of the reception of said data to be transferred based on said data information stored, wherein said central processor monitors said reception information setting means to obtain said data to be transferred stored in said second storage means according to said reception information, and wherein said data information management means of said remote module includes:

first flag setting means for setting first flag data indicative of existence/non-existence of said data to be transferred, and first flag management means for monitoring said first flag data set by said first flag setting means to transmit said first flag data to said switching system according to the state of the flag data.

2. The remote module control system as set forth in claim 1, wherein said reception information setting means of said switching system comprises data information management means for monitoring said data information stored at said first storage means, and flag data setting means for setting flag data indicative of the reception of said data to be transferred indicated by said data information under control of said data information management means, wherein said central processor monitors said flag data setting means to obtain said data to be transferred stored at said second storage means according to the state of said flag data.

3. The remote module control system as set forth in claim 1, wherein said reception information setting means of said switching system includes:

second flag management means for monitoring said first flag data stored at said first storage means, and second flag setting means for setting second flag data indicative of the reception of said data to be transferred indicated by said first flag data under control of said second flag management means, and wherein said central processor monitors said second flag setting means to obtain said data to be transferred stored at said second storage means according to the state of said second flag data.

4. A remote module control method of controlling, from a switching system, a remote module which is disposed at a place remote from said switching system and accommodates a plurality of line/trunk circuits, comprising the steps of:

in said remote module, managing data information indicative of existence/non-existence of data to be transferred which is to be transferred to said switching system and notifying said switching system of the data information as required, and transmitting said data to be transferred indicated by said data information to said switching system, and in said switching system, storing said data information and said data to be transferred received from said remote module at predetermined storage means, setting reception information indicative of the reception of said data to be transferred based on said data information stored at said storage means, and obtaining said data to be transferred stored at said storage means according to said reception information by a central processor mounted on said switching system for controlling said line/trunk circuits, and wherein said data information management step of said remote module includes:

setting first flag data indicative of existence/non-existence of said data to be transferred, and monitoring said first flag data to transmit said first flag data to said switching system according to the state of the first flag data.

5. The remote module control method as set forth in claim 4, wherein at said reception information setting step of said switching system, said data information stored at said storage means is monitored to set flag data indicative of the reception of said data to be transferred indicated by said data information, and at said data to be transferred obtaining step, said central processor obtains said data to be transferred stored at said storage means according to the state of said flag data.

6. The remote module control method as set forth in claim 4, wherein said reception information setting step of said switching system comprises monitoring said first flag data stored at said storage means to detect a state change of the first flag data, and setting second flag data indicative of the reception of said data to be transferred indicated by said first flag data according to the detected state of said first flag data, and at said data to be transferred obtaining step, said central processor obtains said data to be transferred stored at said storage means according to the state of said second flag data.

7. A computer readable memory storing a remote module control program for controlling, from a switching system, a remote module which is disposed at a place remote from said switching system and accommodates a plurality of line/trunk circuits, said remote module control program comprising the steps of:

in said remote module, managing data information indicative of existence/non-existence of data to be transferred which is to be transferred to said switching system and notifying said switching system of the data information as required, and transmitting said data to be transferred indicated by said data information to said switching system, and in said switching system, storing said data information and said data to be transferred received from said remote module at predetermined storage means, setting reception information indicative of the reception of said data to be transferred based on said data information stored at said storage means, and obtaining said data to be transferred stored at said storage means according to said reception information by a central processor mounted on said switching system for controlling said line/trunk circuits, and wherein said data information management step of said control program at said remote module includes:
  setting first flag data indicative of existence/non-existence of said data to be transferred, and
  monitoring said first flag data to transmit said first flag data to said switching system according to the state of the first flag data.

8. The storage medium as set forth in claim 7, wherein in said control program on said switching system, at said reception information setting step, said data information stored at said storage means is monitored to set flag data indicative of the reception of said data to be transferred indicated by said data information, and at said data to be transferred obtaining step, said central processor obtains said data to be transferred stored at said storage means according to the state of said flag data.

9. The storage medium as set forth in claim 7, wherein said reception information setting step of said control program at said switching system includes:
  monitoring said first flag data stored at said storage means to detect a state change of the first flag data, and
  setting second flag data indicative of the reception of said data to be transferred indicated by said first flag data according to the detected state of said first flag data, and at said data to be transferred obtaining step, said central processor obtains said data to be transferred stored at said storage means according to the state of said second flag data.

* * * * *